United States Patent
Abella et al.

(10) Patent No.: US 7,747,913 B2
(45) Date of Patent: Jun. 29, 2010

(54) CORRECTING INTERMITTENT ERRORS IN DATA STORAGE STRUCTURES

(75) Inventors: Jaume Abella, Barcelona (ES); Javier Carretero Casado, Barcelona (ES); Xavier Vera, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 11/833,784

(22) Filed: Aug. 3, 2007

(65) Prior Publication Data

US 2009/0037781 A1  Feb. 5, 2009

(51) Int. Cl.
*G11C 29/00* (2006.01)
*G06F 7/02* (2006.01)
*H03M 13/00* (2006.01)

(52) U.S. Cl. .................. 714/718; 714/722; 714/819; 714/54; 365/200; 365/201

(58) Field of Classification Search ............... 714/722, 714/723, 718, 719, 746, 763, 819, 824, 47, 714/42, 48, 54; 365/200, 201
See application file for complete search history.

(56) References Cited

U.S. PATENT DOCUMENTS

| 4,319,357 A | * | 3/1982 | Bossen | 714/753 |
| 6,799,291 B1 | * | 9/2004 | Kilmer et al. | 714/722 |
| 7,468,923 B2 | * | 12/2008 | Ishimaru | 365/189.11 |

* cited by examiner

*Primary Examiner*—Christine T Tu
(74) *Attorney, Agent, or Firm*—Thomas R. Lane

(57) ABSTRACT

Embodiments of apparatuses and methods for correcting intermittent errors in data storage structures are disclosed. In one embodiment, an apparatus includes a data storage location, error detection logic, inverting logic, control logic, operating logic, and evaluation logic. The error detection logic is to detect an error in a data value read from the data storage location. The inverting logic is to invert the erroneous data value to produce an inverted erroneous data value. The control logic is to cause the inverted erroneous data value to be stored in the data storage location and subsequently read from the data storage location to produce an operand value. The operating logic is to perform a logical operation using the erroneous data value and the operand value. The evaluation logic is to evaluate the result to determine if the error is a soft error.

10 Claims, 2 Drawing Sheets

METHOD 200

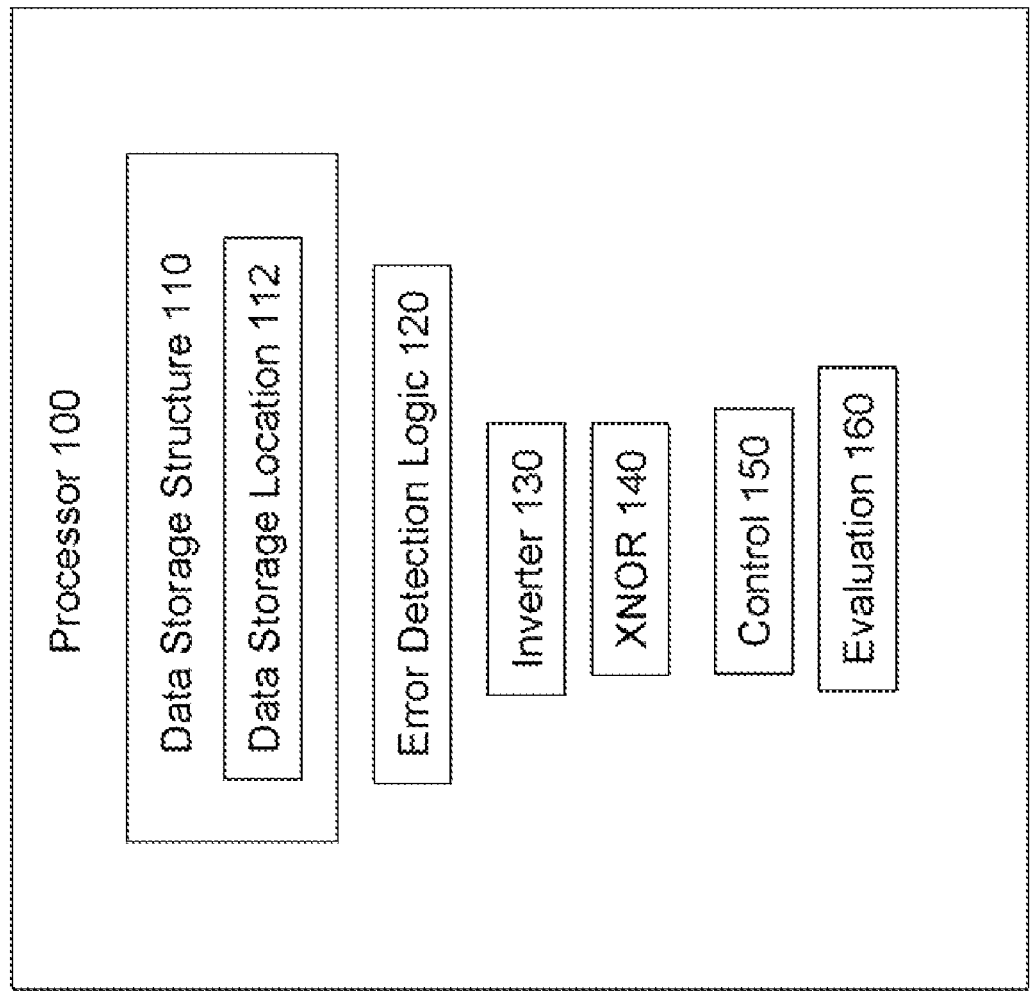

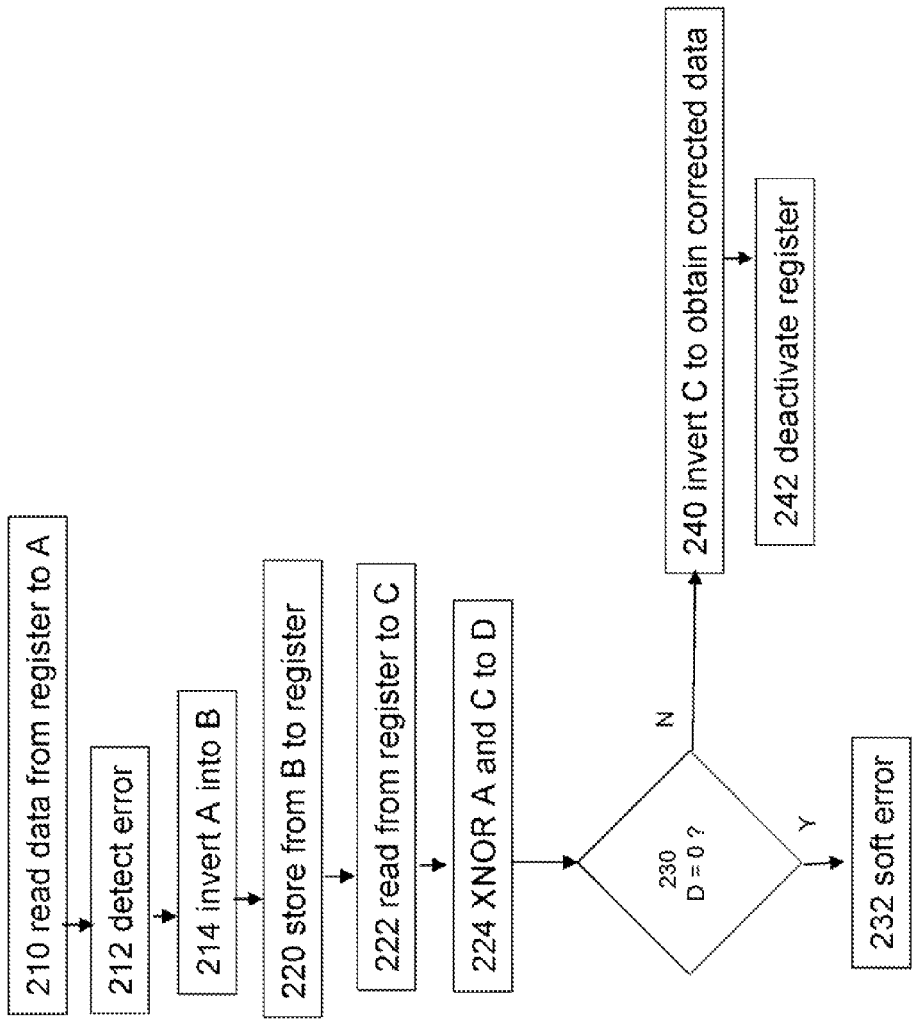

CORRECTING INTERMITTENT ERRORS IN DATA STORAGE STRUCTURES

BACKGROUND

Data storage structures in information processing systems may be affected by different types of errors. Any of these types of errors may make the information processing systems unreliable if the data storage structures are not protected with parity-based or other error detection and/or correction techniques, by changing the values of stored data. However, the storage structures themselves may be affected differently by different types of errors. Hard errors caused by physical defects may render the storage structure permanently unreliable. Soft errors caused by particle strikes may change the value of stored data, but new data may be stored in the same location with no loss of reliability.

In between hard errors and soft errors in terms of reliability, intermittent errors may result from the effects of transient gate oxide leakage current. Transient gate oxide leakage currents may cause the minimum operating voltage at which circuits operate to vary non-deterministically, therefore, even with a guardband applied to the minimum operating voltage specification, nodes within storage structures may become temporarily stuck at a high or a low level. The incidence of intermittent errors is expected to increase as advances in integrated circuit manufacturing provide for smaller circuit dimensions, thinner gate oxides, and reduced operating voltage levels. Low latency data storage structures, such as register files, may be most affected by an increase in intermittent error rates, because they are typically not fully protected by error correction techniques due to the area and delay costs associated with these techniques.

BRIEF DESCRIPTION OF THE FIGURES

The present invention is illustrated by way of example and not limitation in the accompanying figures.

FIG. 1 illustrates a processor including a data storage structure protected from intermittent errors according to an embodiment of the present invention.

FIG. 2 illustrates a method for correcting intermittent errors in a data storage structure according to an embodiment of the present invention.

DETAILED DESCRIPTION

Embodiments of apparatuses and methods for correcting intermittent errors in data storage structures are described. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention may provide for distinguishing between soft errors and intermittent errors in a data storage location, such as a register in a register file. In one embodiment, if an intermittent error is detected, it may be corrected.

FIG. 1 illustrates a processor including a data storage structure protected from intermittent errors according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 100 may include multiple threads or multiple cores in any combination.

Processor 100 includes data storage structure 110, error detection logic 120, inverting logic 130, operating logic 140, control logic 150, and evaluation logic 160. Processor 100 may include any other circuits, structures, or logic not shown in FIG. 1.

Data storage structure 110 may include any circuitry or structures to store data, such as a register file or a cache. Data storage structure includes at least one data storage location 112.

Error detection logic 120 may include any circuitry or logic to detect errors in data. For example, error detection logic 150 may generate one or more parity bits or values for data values to be stored in data storage structure 110. The parity generation may be performed at any time relative to the execution of the instruction associated with the generation of the data value and the storage of the data of the data value. For example, a parity value may be generated in parallel with the generation of the data value, before the data value is stored, or after the data value is stored. The parity values may be used to detect errors in data values read from data storage structure 110.

To store parity values, each data storage location 112 may include a parity field to store a parity bit or value. Alternatively, parity values may be stored in any other data storage location accessible to processor 100, such as a separate protection table within error detection logic 120.

Inverting logic 130 may be any circuitry or logic to logically invert each bit of a data value. Operating logic 140 may be any circuitry or logic to perform a logical operation on data values. In one embodiment, operating logic 140 is an exclusive NOR gate to perform an exclusive NOR operation using two data values as inputs.

Control logic 150 may include any form of circuitry, structure, or logic, including state machine logic, microcode, programmable logic, firmware, or software, that causes processor 100 to execute method embodiments of the present invention, and/or causes processor 100 to access any such circuitry, structure, or logic that causes or instructs processor 100 to execute method embodiments of the present invention. In one embodiment, control logic 150 includes logic to cause processor 100 to respond to the detection of an error in a data value read from a data storage location by storing the inverted erroneous data value in data storage location 112, and subsequently reading the inverted erroneous data value from data storage location 112, as well as logic to deactivate data storage location 112 if it is determined that the error is not a soft error. Functions performed by control logic 150 may be performed by any combination of separate logical or functional units and integrated logical or functional units, where any of these logical or functional units may also perform other functions.

Evaluation logic 160 may be any circuitry or logic to evaluate a result from operating logic 140 to determine whether an error in a data value is a soft error. In one embodiment, evaluation logic 160 is a multiple input OR gate to determine if any bit of the result is a logical one.

FIG. 2 illustrates method 200 for correcting intermittent errors in a data storage structure according to an embodiment of the present invention. Although method embodiments of the present invention are not limited in this respect, reference is made to processor 100 of FIG. 1 to describe method embodiment 200.

In box 210, a data value is read from data storage location 112, for example into latch A. In one embodiment, the data value includes a parity bit generated by error detection logic 120. In box 212, an error is detected in the data value, for example, by checking the data value for correct parity. Therefore, latch A holds an erroneous data value. In box 214, the erroneous data value from latch A is inverted to send an inverted erroneous data value to latch B.

In box 220, the inverted erroneous data value from latch B is stored in data storage location 112, i.e., the same data storage location from which the erroneous data value was read in box 210. In box 222, the contents of data storage location 112 are read to send an operand value to latch C. In box 224, the erroneous data value from latch A and the operand value from latch C are exclusive NORed to send a result to latch D.

In box 230, the contents of latch D are evaluated to determine if the error is a soft error. If, between boxes 220 and 222, the value from latch B was not changed by storing it in data storage location 112, then it may be concluded, in box 232, that the original error was a soft error and not an intermittent or permanent error in data storage location 112. Therefore, the evaluation in box 224 may be a logical OR operation of all of the individual bits of the contents of latch D, to determine if any of them is a logical one. If not (i.e., the contents of latch D is all zeroes), then it may be concluded that the original error was a soft error, and, although there is not enough information to correct the error, it is safe to continue using data storage location 112 (assuming that processor 100 is unaffected by the error or may recover from the error according to another approach).

However, if any bit in latch D is a one, then the error was not a soft error because that bit was changed again by data storage location 112. Therefore, in box 240, the contents of latch C are inverted to yield the corrected data value. In box 242, data storage location 112 is deactivated, for example by adding data storage location 112 to a list of unavailable registers. Data storage location 112 may be reactivated, and optionally tested, after a delay interval to provide for the possibility that the error in data storage location 112 was intermittent and has gone away after the delay interval.

Within the scope of the present invention, the method illustrated in FIG. 2 may be performed in a different order, performed with illustrated boxes omitted, performed with additional boxes added, or performed with a combination of reordered, omitted, or additional boxes.

Some portions of the above descriptions have been presented in terms of algorithms and symbolic representations of operations on data bits within a computer system's registers or memory. These algorithmic descriptions and representations are the means used by those skilled in the data processing arts to effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may have proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is to be appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

Furthermore, processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses and methods for correcting intermittent errors in data storage structures have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a data storage location;
   error detection logic to detect an error in a data value read from the data storage location;
   inverting logic to invert the erroneous data value to produce an inverted erroneous data value;
   control logic to cause the inverted erroneous data value to be stored in the data storage location and subsequently read from the data storage location to produce an operand value;

operating logic to perform a logical operation using the erroneous data value and the operand value to produce a result; and evaluation logic to evaluate the result to determine whether the error is a soft error.

2. The apparatus of claim 1, wherein the operating logic is an exclusive NOR gate.

3. The apparatus of claim 2, wherein the evaluation logic is to determine that the error is a soft error if the result is all zeroes.

4. The apparatus of claim 1, wherein the inverting logic is also to invert the result to produce a corrected data value if the evaluation logic determines that the error is not a soft error.

5. The apparatus of claim 1, wherein the control logic is also to deactivate the storage location if the evaluation logic determines that the error is not a soft error.

6. A method comprising:
reading a data value from a storage location;
detecting an error in the data value;
inverting the erroneous data value to produce an inverted erroneous data value;
storing the inverted erroneous data value in the storage location;
reading the contents of the storage location to produce an operand value;
performing a logical operation using the erroneous data value and the operand value to produce a result; and
evaluating the result to determine if the error is a soft error.

7. The method of claim 6, wherein the logical operation is an exclusive NOR operation.

8. The method of claim 7, wherein evaluating the result includes determining that the error is a soft error if the result is all zeroes.

9. The method of claim 6, further comprising inverting the result to produce a corrected data value if evaluating the result determines that the error is not a soft error.

10. The method of claim 6, further comprising deactivating the storage location if evaluating the result determines that the error is not a soft error.

* * * * *